(12) United States Patent
Li et al.

(10) Patent No.: US 10,651,774 B2
(45) Date of Patent: May 12, 2020

(54) INVERTER AND MOTOR DRIVE DEVICE, FREEZING DEVICE

(71) Applicant: Hitachi-Johnson Controls Air Conditioning, Inc., Tokyo (JP)

(72) Inventors: Dongsheng Li, Tokyo (JP); Yasuo Notohara, Tokyo (JP); Yuuji Yamamoto, Tokyo (JP)

(73) Assignee: Hitachi-Johnson Controls Air Conditioning, Inc., Tokyo (JP)

( * ) Notice: Subject to any disclaimer, the term of this patent is extended or adjusted under 35 U.S.C. 154(b) by 93 days.

(21) Appl. No.: 15/740,152

(22) PCT Filed: May 26, 2016

(86) PCT No.: PCT/IB2016/053077
§ 371 (c)(1),
(2) Date: Dec. 27, 2017

(87) PCT Pub. No.: WO2017/001952
PCT Pub. Date: Jan. 5, 2017

(65) Prior Publication Data
US 2018/0191288 A1 Jul. 5, 2018

(30) Foreign Application Priority Data
Jun. 30, 2015 (JP) ................................. 2015-130567

(51) Int. Cl.
*H02P 27/08* (2006.01)
*H02P 21/00* (2016.01)
(Continued)

(52) U.S. Cl.
CPC .............. *H02P 27/085* (2013.01); *H02P 6/06* (2013.01); *H02P 6/185* (2013.01); *H02P 21/00* (2013.01); *H02P 27/045* (2013.01); *H02P 27/12* (2013.01)

(58) Field of Classification Search
CPC ...... H02P 21/00; H02P 27/045; H02P 27/085; H02P 27/12; H02P 6/06; H02P 6/185
See application file for complete search history.

(56) References Cited

U.S. PATENT DOCUMENTS 5,504,667 A * 4/1996 Tanaka ................ H02M 5/4505
363/37
2004/0232876 A1* 11/2004 Matsushiro ........... H02P 27/045
318/801
(Continued)

FOREIGN PATENT DOCUMENTS

CN 101635555 A 1/2010
CN 102005949 * 1/2011
(Continued)

OTHER PUBLICATIONS

Japanese Office Action received in corresponding Japanese Application No. 2015-130567 dated Mar. 26, 2019.
(Continued)

*Primary Examiner* — Henry T Crenshaw
(74) *Attorney, Agent, or Firm* — Mattingly & Malur, PC

(57) ABSTRACT

An inverter, motor drive device and freezing device, with which it is possible to effectively suppress current beats in the event of over-modulation without requiring additional circuits. This motor driving device includes: a rectifier circuit that converts the AC voltage from an AC power supply into a DC voltage; a smoothing capacitor that smoothes the DC voltage output from the rectifier circuit; an inverter circuit that converts the DC voltage output from the smoothing capacitor into an AC voltage; and a controller that reduces the current beat component by estimating, using a phase locked loop process, the frequency, phase and amplitude of the current beat component in the output current of the inverter circuit, and corrects the voltage
(Continued)

command to the inverter circuit on the basis of the estimated frequency, phase and amplitude.

8 Claims, 9 Drawing Sheets

(51) Int. Cl.
    *H02P 6/06*     (2006.01)
    *H02P 6/185*     (2016.01)
    *H02P 27/04*     (2016.01)
    *H02P 27/12*     (2006.01)

(56) References Cited

U.S. PATENT DOCUMENTS

| | | | |
|---|---|---|---|
| 2004/0232877 A1* | 11/2004 | Kawaji | H02P 27/045 318/802 |
| 2008/0157710 A1 | 7/2008 | Tobari et al. | |
| 2008/0300820 A1 | 12/2008 | Hu | |
| 2010/0045218 A1* | 2/2010 | Tomigashi | H02P 6/183 318/400.02 |
| 2015/0002067 A1* | 1/2015 | Nondahl | H02P 21/00 318/503 |
| 2015/0130380 A1* | 5/2015 | Kato | H02P 6/12 318/400.21 |

FOREIGN PATENT DOCUMENTS

| | | |
|---|---|---|
| CN | 102005949 A | 4/2011 |
| CN | 102801378 A | 11/2012 |
| CN | 103208961 A | 7/2013 |
| JP | 2004-104898 A | 4/2004 |
| JP | 2008-167568 A | 7/2008 |
| JP | 2011-15560 A | 1/2011 |

OTHER PUBLICATIONS

International Search Report of PCT/IB2016/053077 dated Sep. 22, 2016.

* cited by examiner

Time (s)

Time (s)

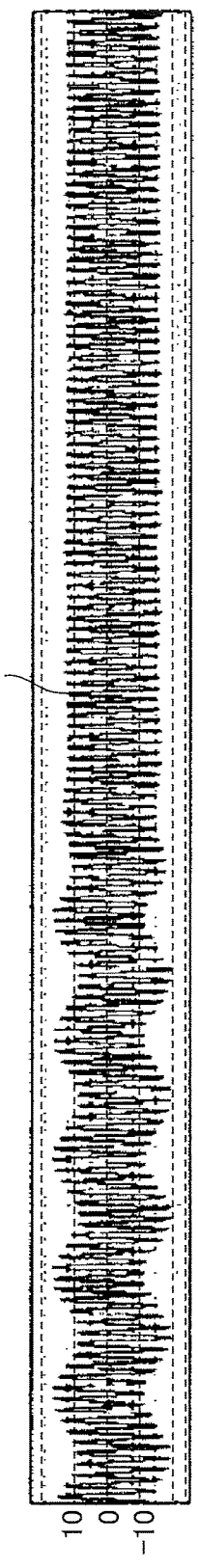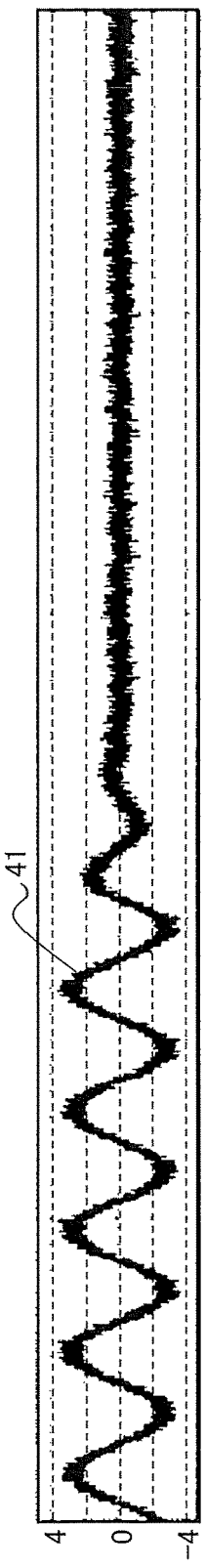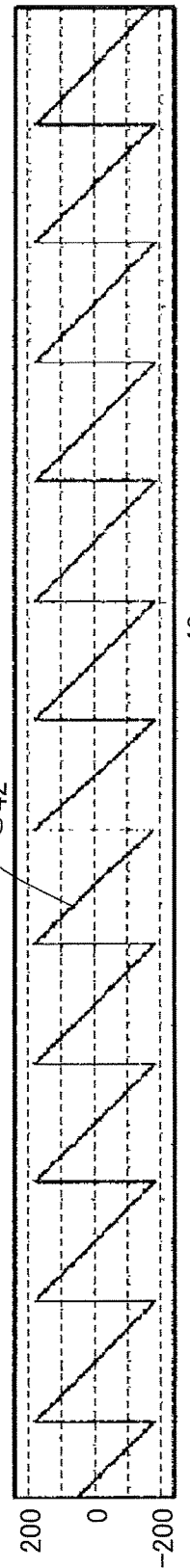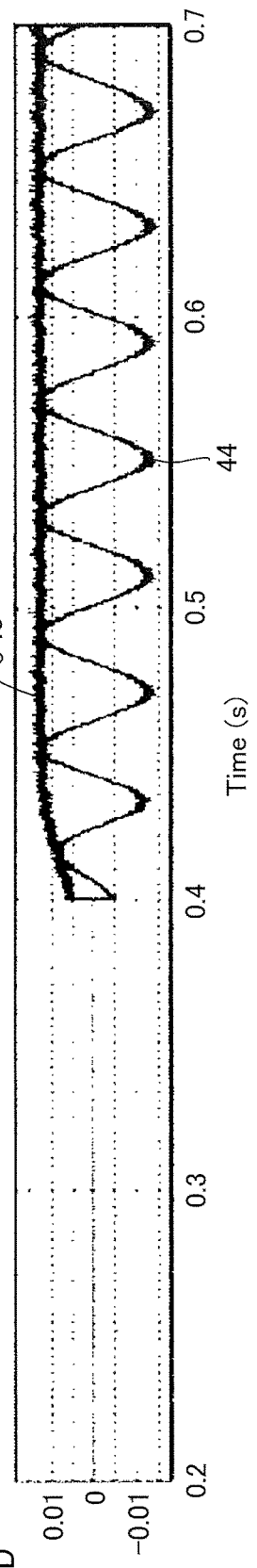

INVERTER AND MOTOR DRIVE DEVICE, FREEZING DEVICE

TECHNICAL FIELD

The present invention relates to an inverter, a motor drive device, and a freezing device including the same. Particularly, the present invention relates to a technology for reducing torque ripples, vibrations, and noises of a motor by suppressing a current beat of a low frequency generated due to voltage ripples on a DC voltage in a motor drive device for driving a motor using an inverter for converting a DC voltage into an AC voltage.

BACKGROUND ART

Motor drive devices including a rectifying circuit for converting an AC voltage from an AC power source into a DC voltage and an inverter for converting a DC voltage into an AC voltage have been widely used in a freezing devices such as air conditioners and industrial devices.

When a single phase or three-phase AC voltages are converted into a DC voltage with a diode rectifying circuit, a voltage ripple may be generated having a frequency component which is twice or six times the frequency (fs) of the AC voltage inputted into the rectifying circuit in the DC voltage. The voltage ripple can be reduced by increase in capacitance of a smoothing capacitor connected to an output side of the rectifying circuit. However, there is a problem in increase in the cost and the volume.

When the DC voltage includes the voltage ripples, this causes the output voltage of the inverter to include a "difference frequency component" between a DC voltage ripple frequency (fr) component and the output frequency component of the inverter (|fr−fl|) due to detection delay of the DC voltage and operation delay in an inverter controller in addition to the output frequency (fl) component of the inverter.

When the output frequency of the inverter approaches the DC voltage ripple frequency, a beat phenomenon is caused by "difference frequency component" when a resistance or inductances of windings of the motor driven by the inverter are low, which generates a large pulsate current, so that an output torque of the motor pulsates. Particularly, at an over-modulation region of the inverter, the beat phenomenon becomes remarkable because there is a section in which amplitude of the output voltage cannot be adjusted.

For example, Patent document 1 (JP2004-104898 A) disclosed as a method of suppressing a current beat phenomenon a method of correcting a three-phase voltage command value as a method of suppressing the beat phenomenon by detecting a high frequency component of a γ-δ axis current on a rotary coordinate system, calculating a three-phase current beat components, and amplifying the operated value.

Patent document 2 (JP2008-167568 A) disclosed a method of suppressing the current beat by correcting an output voltage of the inverter through a process of multiplying, etc. a motor current detection value by a sine (sin) signal and a cosine (cos) signal.

Further, Patent document 3 (JP2015-42010 A) disclosed a method of correcting each of phase voltage commands by detecting pulsating component of a low frequency through a periodic integration process of each of phase output voltages of the inverter.

PRIOR ART

Patent Document

PATENT DOCUMENT 1: JP2004-104898 A
PATENT DOCUMENT 2: JP2008-167568 A
PATENT DOCUMENT 3: JP2015-42010 A

SUMMARY OF INVENTION

Problem to be Solved by Invention

The method disclosed in Patent document 1 (JP2004-104898) using a such simple control structure that a current beat component is extracted from a detection signal of a motor current using a high-pass filter or a low-pass filter and a beat compensating voltage is calculated with the amplifier. However, when the current detection signal includes noises and distortion, a similar noise or distortion occurs in the compensated voltage, so that the control system may become unstable. Particularly, an erroneous operation may occur in response to a rapid change in the motor current due to a load variation, etc. This method has a defect that the current beat components are left in principle as long as the amplifier does not have an infinite gain.

On the other hand, the method disclosed in Patent document (JP2008-167568 A) suppresses the current beat, instead the high-pass filter or the low-pass filter, by calculating a compensation voltage from the detection signal of the motor current through a process of a sine (sin) signal and a cosine (cos) signal to correct the voltage command value. This method has a high stableness in the control because only the beat frequency components are left in the beat compensation voltage caused by multiplication of the sine (sin) signal and the cosine (cos) signal, but has a defect in decrease in compensation effect since the output voltage of the inverter becomes saturated in over-modulation. More specifically, through the compensation component is added to the output voltage command of the inverter, the output voltage becomes saturated upon the over-modulation, so that it is not possible to output the voltage to which the compensation quantity is added because the voltage higher than this cannot be outputted.

Patent document 3 (JP2015-42010 A) disclosed a means for directly detecting a pulsating component in an output voltage of an inverter with a voltage detecting circuit and calculating a beat compensation voltage. However, this needs a voltage detecting circuit having a high accuracy.

An aspect of the present invention provides an inverter, a motor drive device, and a freezing device capable of suppressing the current beat effective even upon the over-modulation, using a PLL (Phase Locked Loop) without necessity of additional configuration such as the high-pass filter, the voltage detection circuit, etc.

Means for Solving Problem

An aspect of the present invention provides an inverter, a motor drive device, or a freezing device. The invention includes:

a rectifying circuit that converts an AC voltage from an AC power source into a DC voltage;

a smoothing capacitor that smoothes a DC voltage which is an output of the rectifying circuit;

an inverter circuit that converts into an AC voltage a DC voltage which is an output of the smoothing capacitor; and a controller that estimates a frequency, a phase, and an amplitude of a current beat component in an output current of the inverter circuit through a PLL (Phase Locked Loop) process and corrects a voltage command to the inverter circuit on the basis of the estimated frequency, the estimated phase, and the estimated amplitude to reduce the current beat component.

Other means will be described in "MODES FOR CARRYING OUT INVENTION".

Advantageous Effect of Invention

An aspect of the present invention provides the inverter device, a motor drive device, and a freezing device capable of suppressing the current beat and effective even upon the over-modulation without necessity of additional structures such as the high-pass filter, voltage detecting circuit, etc.

BRIEF DESCRIPTION OF DRAWINGS

FIGS. 8A to 8D show waveforms of currents and voltages representing a beat suppression effect of the motor drive device according to the first embodiment of the present invention.

MODES FOR CARRYING OUT INVENTION

First Embodiment

Hereinbelow will be described a first embodiment of the present invention.
(General Configuration)

Figure 1:
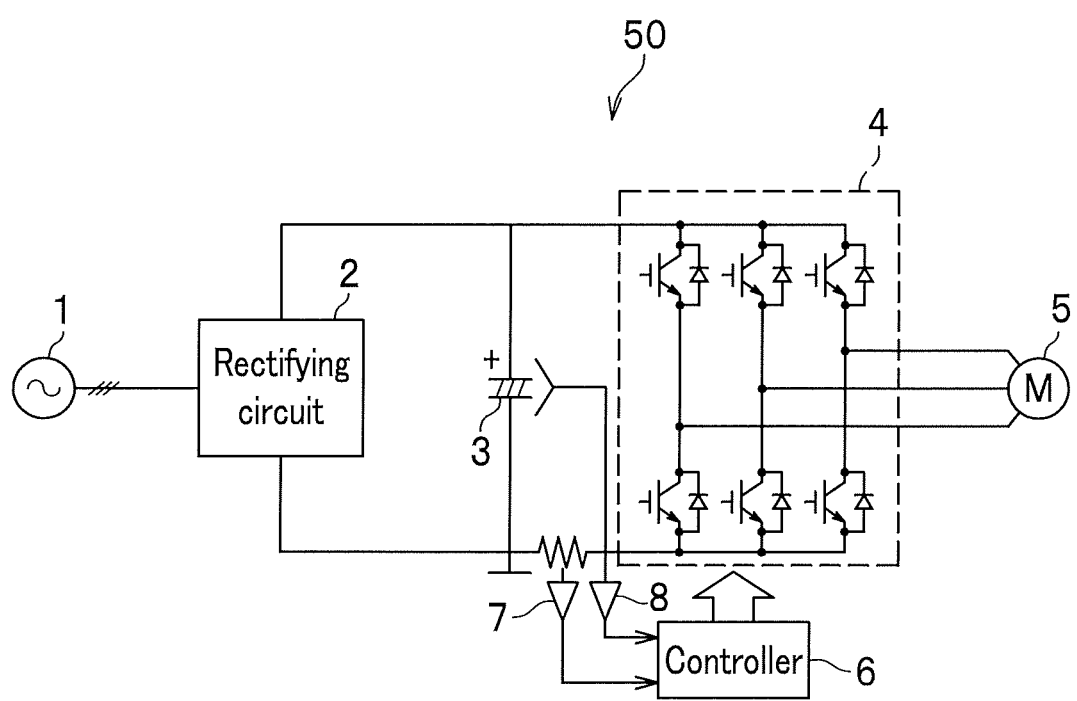
FIG. 1 is a block diagram of a motor drive device according to a first embodiment of the present invention.

FIG. 1 shows a general configuration of a motor drive device 50 according to a first embodiment of the present invention. The motor drive device 50 according to the first embodiment is connected to a AC power source 1 and includes a rectifying circuit 2 for converting AC voltages from the AC power source 1 into a DC voltage. A smoothing capacitor 3 is connected to DC output terminals of the rectifying circuit 2 to smooth a DC voltage which is an output of the rectifying circuit 2. An inverter circuit 4 outputs voltages from the DC voltage which is an output of the smoothing capacitor 3 and PWM control signals to drive the motor 5 of which rotation speed is controlled. The motor drive device 50 according to the first embodiment also functions as a power converter for converting the AC power supplied from the AC power source 1 into another AC power.

A bus bar current detection circuit 7 detects a DC current (bus bar current) of the inverter circuit 4 by a shunt resistor connected between the smoothing capacitor 3 and the inverter circuit 4 and an amplifier. Further, the motor drive device 50 is configured including a controller 6 for controlling the inverter circuit 4 and a DC voltage detecting circuit 8. The controller 6 is provided using semiconductor operation devices such as a microcomputer or a DSP (digital signal processor).
(Controller Configuration)

Figure 2:
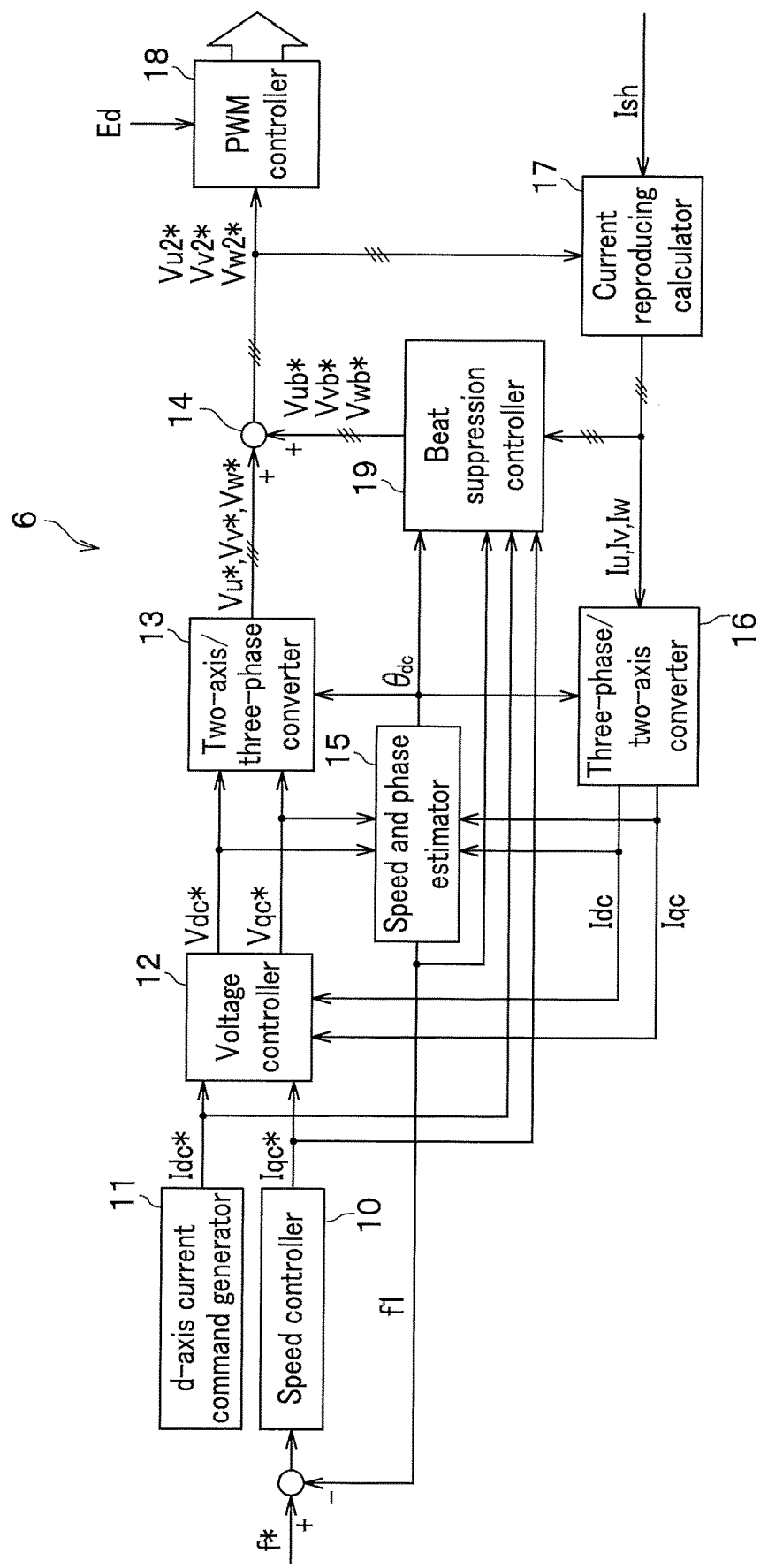
FIG. 2 is a functional block diagram of a control part of the motor drive circuit according to the first embodiment of the present invention.

FIG. 2 shows a configuration of the controller 6 of the inverter circuit 4 and each of functions is provided by control programs stored in the CPU (computer) and a memory unit. The controller 6 calculates the voltage command signal supplied to the motor 5 through vector control to generate PWM control signals for the inverter circuit 4 and includes a speed controller 10, a d-axis current command generator 11, a voltage controller 12, a two-axis/three-phase converter 13, a command voltage adjuster 14, a speed and phase estimator 15, a three-phase/two-axis converter 16, a current reproducing calculator 17, a PWM controller 18, and a beat suppression controller 19.

The current reproducing calculator 17 reproduces output currents (Iu, Iv, Iw) of the inverter circuit 4 using a detection signal (Ish) outputted by the bus bar current detection circuit 7 and three-phase voltage command values (Vu2*, Vv2*, Vw2*). Regarding this, to reduce a circuit cost, a method of reproducing the three-phase currents from the bas bar currents is adopted. However, it is also possible to directly detect three-phase output currents (Iu, Iv, Iw) using a means such as current sensors.

Figure 3:
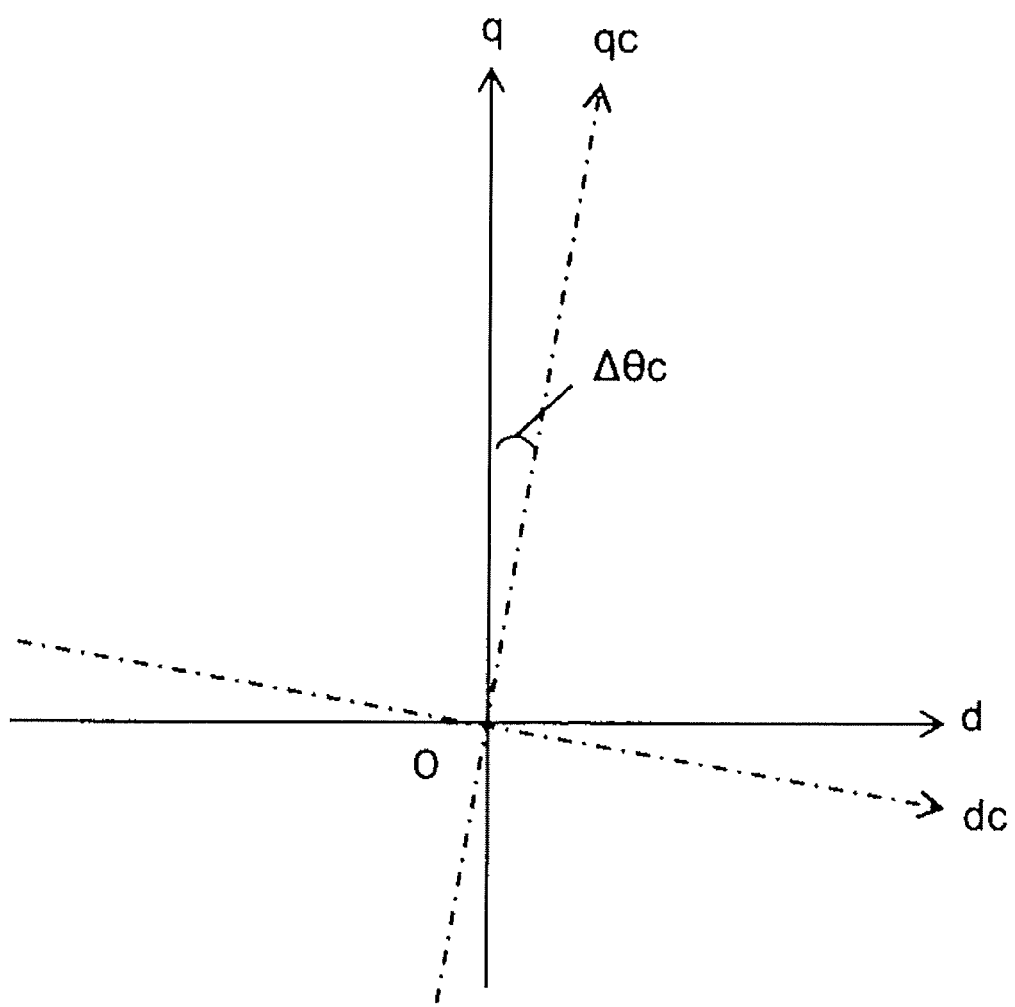
FIG. 3 shows a control axis and a motor rotating axis of the motor drive device according to the first embodiment of the present invention.

FIG. 3 is a drawing showing control axes and motor rotation axes of the motor drive device 50 according to the first embodiment in which dc-qc axes are estimated axes of the control system, and a d-q axes are motor rotor axes. The d-q axes have deviation from the dc-qc axes by an error Δθc. The three-phase/two-axis converter 16 shown in FIG. 2 calculates a dc-axis current (Idc) and a qc-axis current (Iqc) on the basis of the reproduced three-phase output currents (Iu, Iv, Iw) and phase information (θdc) estimated by the speed and phase estimator 15 according to Eq. (1).

$$\begin{pmatrix} I_\alpha \\ I_\beta \end{pmatrix} = \frac{2}{3} \begin{pmatrix} 1 & -\cos(\pi/3) & -\cos(\pi/3) \\ 0 & \cos(\pi/6) & -\cos(\pi/6) \end{pmatrix} \begin{pmatrix} I_u \\ I_v \\ I_w \end{pmatrix}$$

$$\begin{pmatrix} I_{dc} \\ I_{qc} \end{pmatrix} = \begin{pmatrix} \cos(\theta_{dc}) & \sin(\theta_{dc}) \\ -\sin(\theta_{dc}) & \cos(\theta_{dc}) \end{pmatrix} \begin{pmatrix} I_\alpha \\ I_\beta \end{pmatrix}$$

Eq. 1

The speed controller 10 generates, in response to an external speed command value (f*), a q-axis current command value (Iqc*) from a difference between a speed command value (f*) and an estimated speed (f1). The d-axis current command generator 11 generates a d-axis current command value (Idc*) to minimize the motor current.

The voltage controller 12 calculates a dc-axis voltage command Vdc* and a qc-axis voltage command value Vqc* using a d-axis current command value (Idc*) supplied from the d-axis current command generator 11 and a q-axis current command value (Iqc*) supplied from the speed controller 10, a dc-axis current detection value Idc, a qc-axis detection value Iqc, and a motor constant.

The two-axis/three-phase converter 13 calculates three-phase command voltages (Vu*, Vv*, Vw*) using the calculated dc-axis voltage command value Vdc*, a qc-axis voltage command value Vqc*, and phase information (θdc) from the speed and phase estimator 15. This is shown in Eq. (2).

$$\begin{pmatrix} V_\alpha \\ V_\beta \end{pmatrix} = \begin{pmatrix} \cos(\theta_{dc}) & -\sin(\theta_{dc}) \\ \sin(\theta_{dc}) & \cos(\theta_{dc}) \end{pmatrix} \begin{pmatrix} V_{dc}^* \\ V_{qc}^* \end{pmatrix} \quad \text{Eq. 2}$$

$$\begin{pmatrix} V_u^* \\ V_v^* \\ V_w^* \end{pmatrix} = \begin{pmatrix} 1 & 0 \\ -\cos(\pi/3) & \cos(\pi/6) \\ -\cos(\pi/3) & -\cos(\pi/6) \end{pmatrix} \begin{pmatrix} V_\alpha \\ V_\beta \end{pmatrix}$$

A process in the speed and phase estimator 15 is the same as that disclosed by Patent document 2, and a detailed description is omitted. This control eliminates the necessity of a rotor position sensor of the motor 5, so that a cost reduction of the whole of the drive system can be reduced. Naturally, it is also possible that the position information of the rotor is always detected using a rotor position sensor such as an encoder.

The command voltage adjuster 14 corrects the three-phase command voltages (Vu*, Vv*, Vw*) using the calculated quantities (Vub*, Vvb*, Vwb*) from the beat suppression controller 19 and inputs the corrected command voltages into the PWM controller 18. A detailed description about the method of calculation in the beat suppression controller 19 will be made later.

At last, the PWM controller 18 generates a PWM (Pulse width modulation) control signal for the inverter circuit 4 by calculating a modulation factor using a DC voltage signal (Ed) from the DC voltage detecting circuit 8. Semiconductor switching elements such as IGBT (Insulated Gate Bipolar Transistor) and power MOSs (Metal-oxide-semiconductor), etc. perform ON and OFF operations in accordance with the PWM control signals to output pulsate voltages (of which amplitude value varies in accordance with the DC voltage, and of which width varies with the PWM signal).

Figure 4:
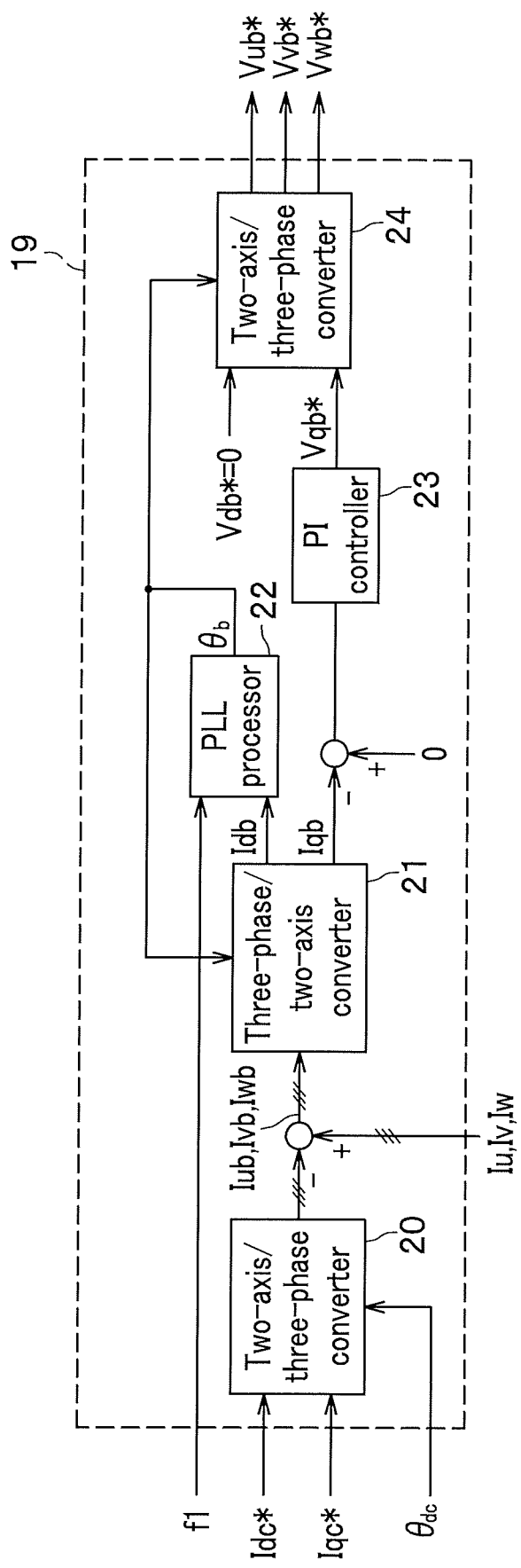
FIG. 4 is a block diagram of the beat suppression controller for the motor drive device according to the first embodiment of the present invention.

FIG. 4 is a drawing illustrating a detailed configuration of the beat suppression controller 19. At first, the beat suppression controller 19 converts a current command (Idc*, Iqc*) of the dc-qc axes into three-phase current command (Iu*, Iv*, Iw*) using a two-axis/three-phase converter 20. This is shown in Eq. (3).

$$\begin{pmatrix} I_\alpha^* \\ I_\beta^* \end{pmatrix} = \begin{pmatrix} \cos(\theta_{dc}) & -\sin(\theta_{dc}) \\ \sin(\theta_{dc}) & \cos(\theta_{dc}) \end{pmatrix} \begin{pmatrix} I_{dc}^* \\ I_{qc}^* \end{pmatrix} \quad \text{Eq. 3}$$

$$\begin{pmatrix} I_u^* \\ I_v^* \\ I_w^* \end{pmatrix} = \begin{pmatrix} 1 & 0 \\ -\cos(\pi/3) & \cos(\pi/6) \\ -\cos(\pi/3) & -\cos(\pi/6) \end{pmatrix} \begin{pmatrix} I_\alpha^* \\ I_\beta^* \end{pmatrix}$$

Further the beat suppression controller 19 calculates a current beat component of each phase by a difference operation between the detected three-phase current signals (Iu, Iv, Iw) and three-phase current commands (Iu*, Iv*, Iw*). This is shown in Eq. (4).

$$\begin{pmatrix} I_{ub} \\ I_{vb} \\ I_{wb} \end{pmatrix} = \begin{pmatrix} I_u \\ I_v \\ I_w \end{pmatrix} - \begin{pmatrix} I_u^* \\ I_v^* \\ I_w^* \end{pmatrix} \quad \text{Eq. 4}$$

Next, the beat suppression controller 19 calculates current component quantities (Idb, Iqb) on beat rotation axes (db-qb axes) using a three-phase/two-axis converter 21. This is shown in Eq. (5). The beat rotation axis (db-qb axes) is defined as a coordinate system which is not related to the control axes (dc-qc axes) and the motor axes (d-q axes). The phase (θb) of the beat rotation axis is adjusted by a PLL processor 22.

$$\begin{pmatrix} I_{\alpha b} \\ I_{\beta b} \end{pmatrix} = \frac{2}{3} \begin{pmatrix} 1 & -\cos(\pi/3) & -\cos(\pi/3) \\ 0 & \cos(\pi/6) & -\cos(\pi/6) \end{pmatrix} \begin{pmatrix} I_{ub} \\ I_{vb} \\ I_{wb} \end{pmatrix} \quad \text{Eq. (5)}$$

$$\begin{pmatrix} I_{db} \\ I_{qb} \end{pmatrix} = \begin{pmatrix} \cos(\theta_b) & \sin(\theta_b) \\ -\sin(\theta_b) & \cos(\theta_b) \end{pmatrix} \begin{pmatrix} I_{\alpha b} \\ I_{\beta b} \end{pmatrix}$$

Figure 5:
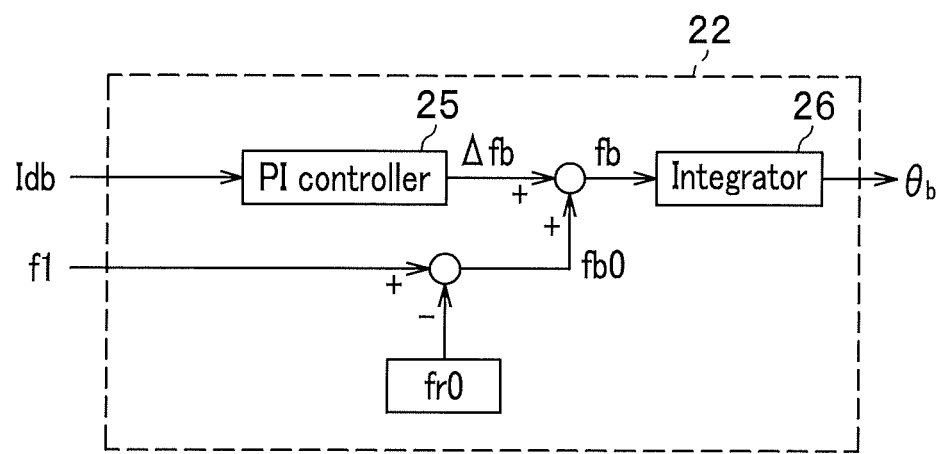
FIG. 5 is a block diagram of a PLL controller for the motor drive device according to the first embodiment of the present invention.

FIG. 5 shows a detailed configuration of the PLL processor 22. The PLL processor 22 calculates an adjustment quantity (Δfb) of a beat frequency by inputting a db-axis current component quantity (Idb) of the beat rotation axis into a PI controller 25. The PLL processor 22 obtains a beat frequency (fb) by summing the adjustment quantity (Δfb) and a theatrical value of the beat frequency (fb0) calculated by subtracting a DC voltage ripple frequency (fr0) previously set from an estimated speed (f1), and calculates a phase (θb) of beat rotation axis using an integrator 26 from the beat frequency (fb). Incidentally, it is also possible to input a speed command (f*) into the PLL processor 22 in place of the estimated speed (f1).

The DC voltage ripple frequency (fr0) has been previously set in accordance with a power source frequency (50/60 Hz) and the number of AC phases. If the power source frequency cannot be known previously, the DC voltage ripple frequency (fr0) can be set to an intermediate value (55 Hz) of two kinds of power source frequencies because the PLL processor 22 can correct a setting error of the frequency. This eliminates the necessity of an adjustment operation for the power source frequency at shipment or installation of a product. Further, the beat suppression controller 19 can detect the AC power source frequency by estimating the ripple frequency of the DC voltage from a frequency error in the PLL processor 22.

When the db-axis current component quantity (Idb) of the beat rotation axis is about zero by adjustment of the PLL processor 22, a qb-axis current component quantity (Iqb) of the beat rotation axis corresponds to a magnitude of the current beat (amplitude value). Further, occurrence of the current beat phenomenon can be determined by comparing a magnitude of the qb-axis current component quantity (Iqb) with a predetermined value. Accordingly, the beat suppression controller 19 calculates a qb-axis current component (Vqb*) of the voltage correction quantity by processing a difference between the qb-axis current component quantity (Iqb) of the beat rotation axis and zero to suppress the current beat.

In this operation, the qb-axis current component (Vqb*) of the voltage correction quantity is calculated by proportional plus integral control using a PI controller 23. However, it is also possible to calculate it by a controller of either proportional plus integral controller or an integral controller in place of the PI controller 23. The use of the PI controller or the integral controller enables perfect elimination of the current beat in a normal state in principle.

At last, the beat suppression controller 19 calculates the three-phase voltage correction quantities (Vub*, Vvb*, Vwb*) from a db-axis component quantity (Vdb*) of the correction quantity, a qb-axis component quantity of the voltage correction quantity, and a phase (θb) of the beat rotation axis using a two-axis/three-phase converter 24. This is shown in Eq. (1). Here, the db-axis component quantity (Vdb*) is set to zero. The reasons are as follows:

The db-axis current component quantity (Idb) is about zero, so that the beat frequency is low. Accordingly, a main component influence on the beat component is a resistance of motor windings. Accordingly, a relation between the voltage and the current is approximately linear.

$$\begin{pmatrix} V_{ab}^* \\ V_{\beta b}^* \end{pmatrix} = \begin{pmatrix} \cos(\theta_b) & -\sin(\theta_b) \\ \sin(\theta_b) & \cos(\theta_b) \end{pmatrix} \begin{pmatrix} V_{db}^* \\ V_{qb}^* \end{pmatrix} \quad \text{Eq. 6}$$

$$\begin{pmatrix} V_{ub}^* \\ V_{vb}^* \\ V_{wb}^* \end{pmatrix} = \begin{pmatrix} 1 & 0 \\ -\cos(\pi/3) & \cos(\pi/6) \\ -\cos(\pi/3) & -\cos(\pi/6) \end{pmatrix} \begin{pmatrix} V_{ab}^* \\ V_{\beta b}^* \end{pmatrix}$$

Next, a principle of suppressing the current beat using the voltage correction quantity (Vub*, Vvb*, Vwb*).

Figure 6A:
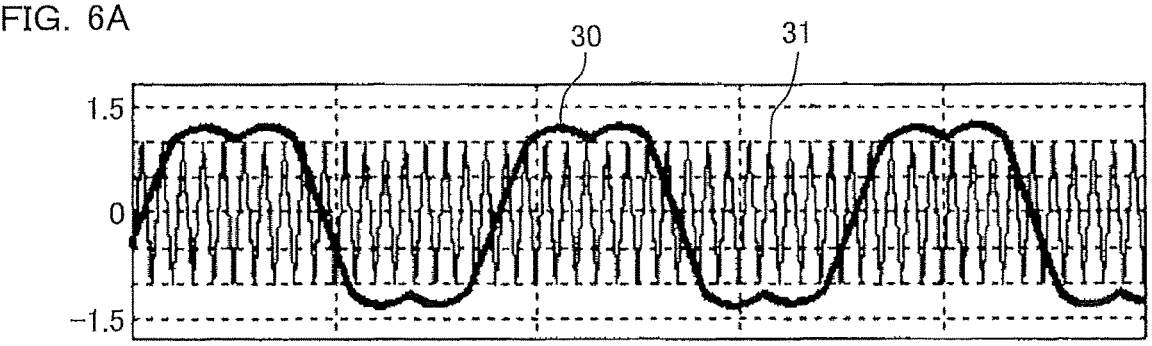
FIGS. 6A to 6D show waveforms of current and voltage in the motor drive device according to the first embodiment of the present invention.
Figure 6B:
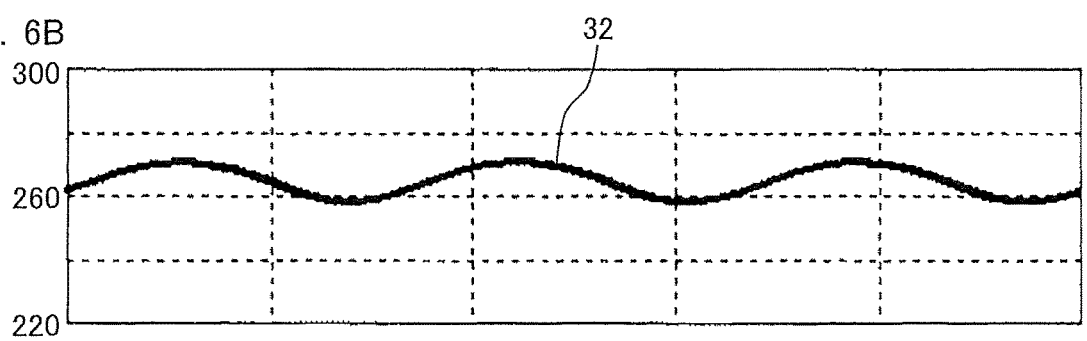
Figure 6C:
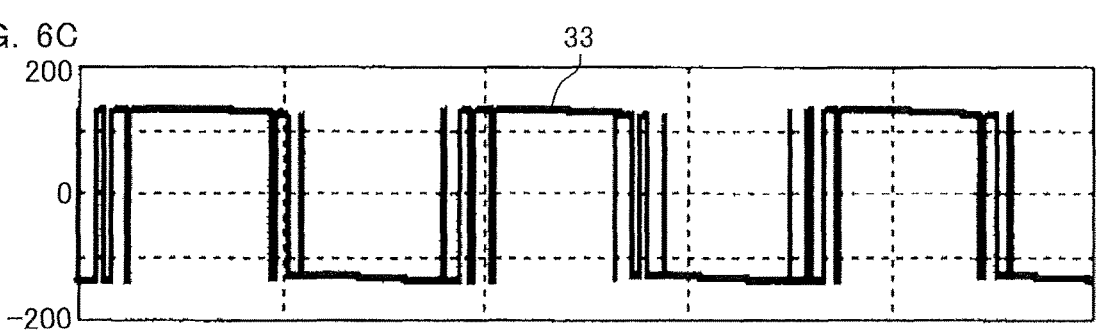
Figure 6D:
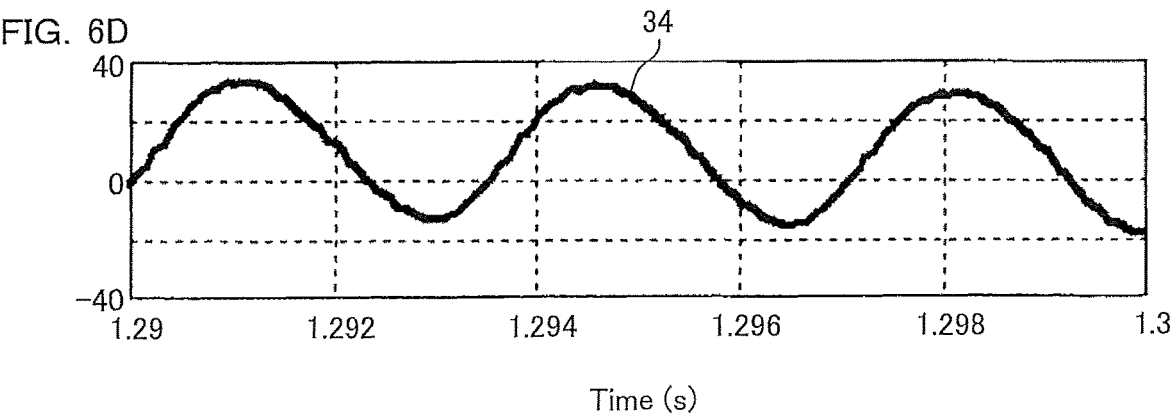

FIG. 6A shows a U-phase modulation wave waveform (Mu=Vu2*/(Ed/2)) 30, a carrier wave 31. FIG. 6B shows a DC voltage waveform 32. FIG. 6C shows a U-phase voltage waveform 33. FIG. 6D shows a U-phase current waveform 34 when there is no beat suppressing control (voltage correction quantities (Vub*, Vvb*, Vwb*) is zero). The PWM controller 18 generates of U-phase PWM pulses by comparing the U-phase modulation wave waveform 30 with the carrier wave 31 to control the U-phase voltage waveform 33. For easy understanding, the U-phase voltage waveform 33 indicates a voltage waveform between the U-phase output terminal and an imaginarily middle point of the DC voltage.

At sections where the DC voltage waveform 32 is high (for example, a period around 1.298 s on the time axis), an absolute value of the U-phase voltage waveform 33 is large. On the other hand, at sections where the DC voltage waveform 32 is low (for example, a period around 1.296 s on the time axis), an absolute value of the U-phase voltage waveform 33 becomes small. In other words, variations in the DC voltage waveform 32 also appear in the magnitude of the U-phase voltage waveform 33.

As shown in FIG. 6A, at sections where the U-phase modulation wave waveform 30 has a value higher than a positive peak value of the carrier wave 31 or at sections where the U-phase modulation wave waveform 30 has a value lower than a negative peak value of the carrier wave 31, it becomes impossible to adjust a pulse width of the U-phase voltage waveform 33. Accordingly, if a pulsation frequency of the DC voltage waveform 32 approaches the frequency of the U-phase voltage waveform 33, when a positive voltage outputting section of the U-phase voltage waveform 33 are synchronous with a section of the DC voltage waveform 32 having a high value, and when a negative voltage outputting section of the U-phase voltage waveform 33 is synchronous with a section of the DC voltage waveform 32 having low values, a positive average component appears on the U-phase voltage waveform 33. This also influences the U-phase current waveform 34 to have a positive average component thereon.

Inversely, when the positive voltage outputting section of the U-phase voltage waveform 33 are synchronous with a section of the DC voltage waveform 32 having low values, and when the negative voltage outputting section of the U-phase voltage waveform 33 is synchronous with a section of the DC voltage waveform 32 having high values, a negative average component appears on the U-phase voltage waveform 33. This also influences the U-phase current waveform 34 to have the negative average components thereon.

Figure 7A:
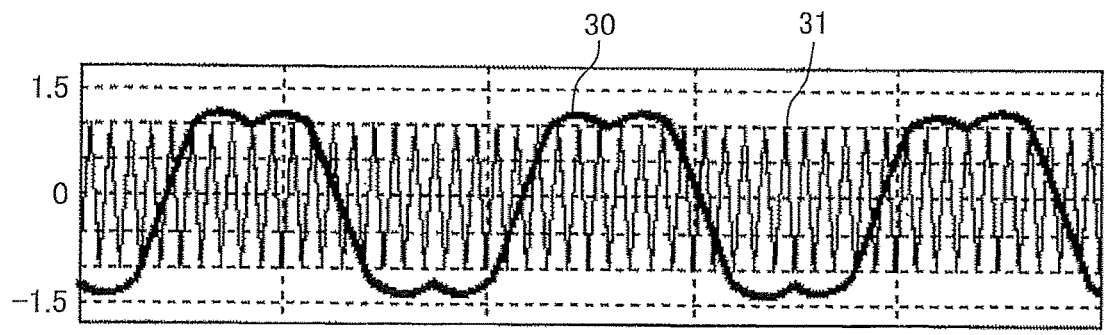
FIGS. 7A to 7D show waveforms of current and voltage in the motor drive
Figure 7B:
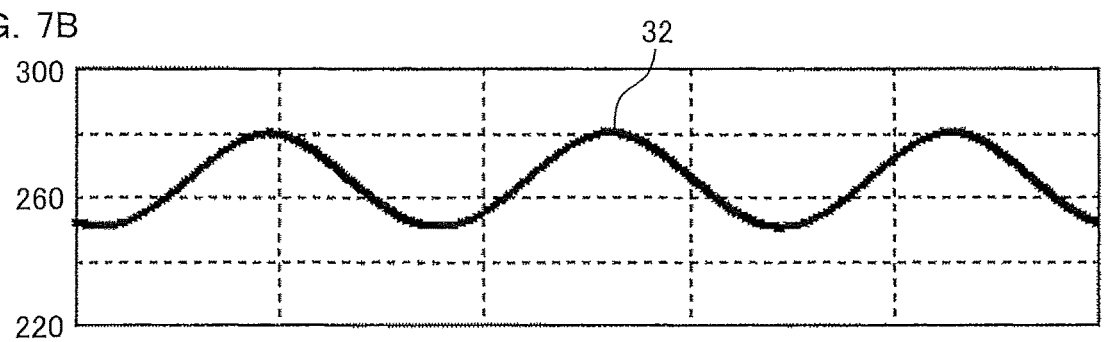
Figure 7C:
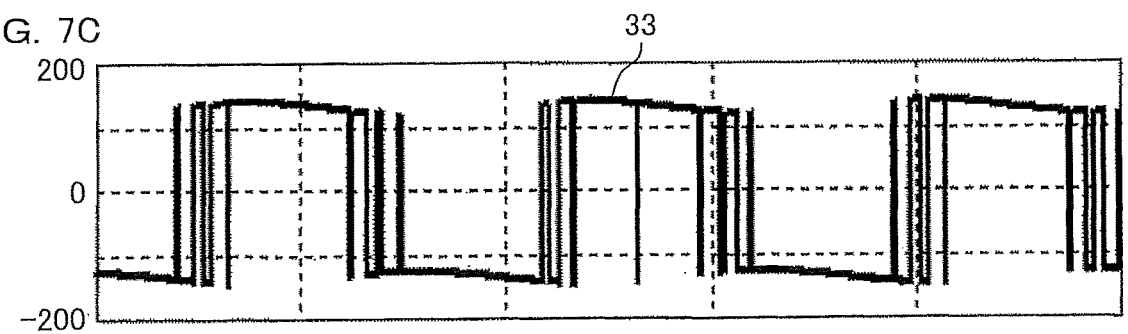
Figure 7D:
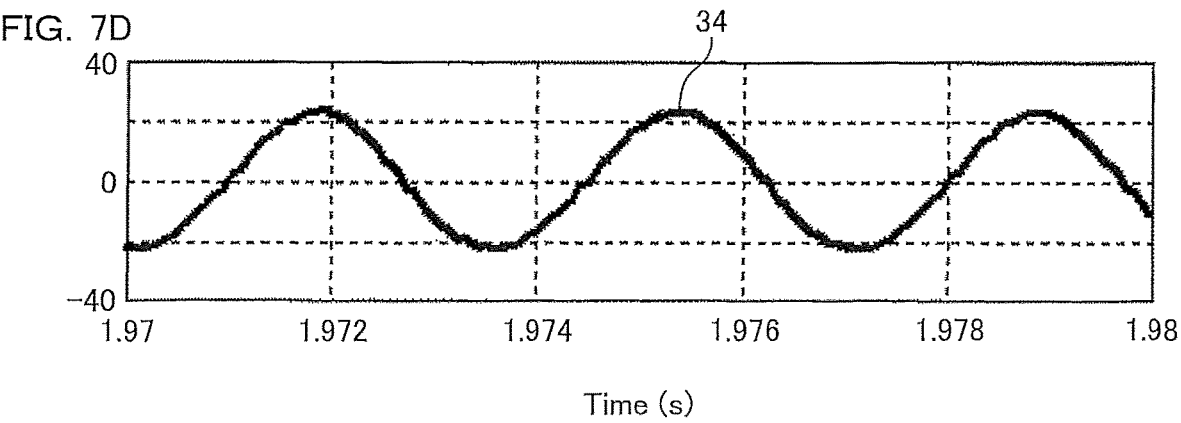

FIGS. 7A to 7D show waveforms showing effect of suppressing beats with voltage correction quantities (Vub*, Vvb*, Vwb*). The U-phase modulation wave waveform 30 in FIG. 7A is a waveform of the modulation wave after addition of the voltage correction quantities (Vub*, Vvb*, Vwb*). Correction of the voltage correction quantities (Vub*, Vvb*, Vwb*) superimpose a bias component quantity on the modulation wave.

For example, as shown in FIG. 7A, when the U-phase voltage correction quantity (Vub*) is negative, the U-phase modulation wave waveform 30 is shifted to a negative direction, and a width of the U-phase voltage waveform 33 having positive values becomes narrow, but a width of the U-phase voltage waveform 33 having negative values becomes broad. As a result, the width of the U-phase voltage waveform 33 where the U-phase voltage waveform 33 is positive at a section (for example, around 1.972 sec) where the DC voltage waveform 32 has high values. Inversely, a width of the U-phase voltage waveform 33 where the U-phase voltage waveform 33 is positive at a section (for example, around 1.977 sec) where the DC voltage waveform 32 has low values. This suppresses the current beat by adjusting (compensating) the average component of the U-phase voltage waveform 33 by the U-phase voltage correction quantity (Vub*).

FIGS. 8A to 8D show waveforms indicating effect of the voltage correction described above, i.e., a beat rotation axis phase wave 42, a qb-axis component quantity waveform 43 of the voltage correction quantity, and a U-phase voltage correction waveform 44. A U-phase current beat waveform 41 is a waveform of the U-phase current beat component (Iub). The beat rotation axis phase wave 42 is a waveform of the beat rotation axis phase (θb). The qb-axis component quantity waveform 43 of the voltage correction quantity is a waveform of the qb-axis component quantity (Vqb*) of the voltage correction quantity. The U-phase voltage correction waveform 44 is a waveform of a U-phase voltage correction quantity (Vub*). It can be confirmed that addition of the voltage correction quantity (Vub*) according to the embodiment largely suppresses the current beat components (Iub).

Second Embodiment

Figure 9:
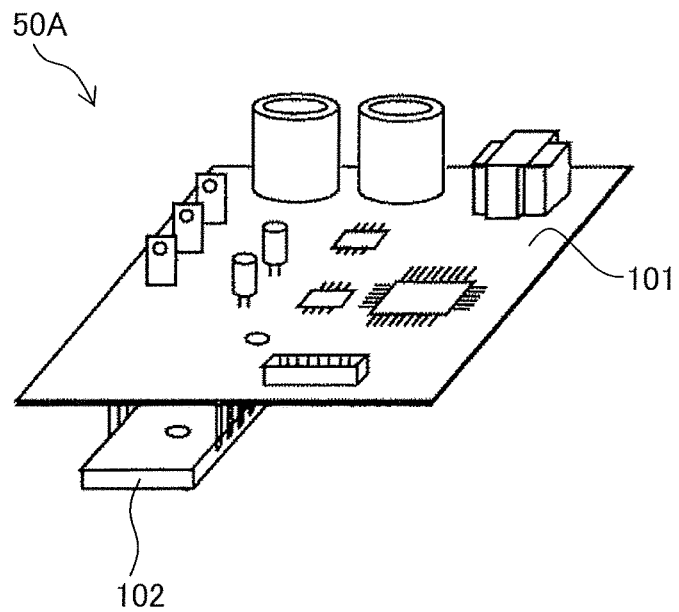
FIG. 9 is a perspective view of a motor drive module according to a second embodiment of the present invention.

FIG. 9 is a perspective view of a motor drive module 51 according to a second embodiment of the present invention and shows an embodiment of a final product of the motor drive module 51.

The motor drive module 51 is a module for the motor drive device 50 in which switching devices 102 are installed on a controller pc board 101. On the controller pc board 101, the bus bar current detection circuit 7, the DC voltage detecting circuit 8, and the controller 6 are directly installed and the inverter circuit 4, which are shown in FIG. 1, is installed as the switching devices 102 which is produced as one chip. Down-sizing can be achieved by modularization with cost reduction.

The "module" means "standardized configuration unit" which is formed from parts of hardware or software which is separately. Further, it is desirable that the module is formed on the same substrate in manufacturing. However, the invention is not limited to the same substrate. Accordingly, it is also possible that the circuit is formed by a plurality of circuit boards housed in the same case.

According to the second embodiment, the use of the motor drive device 50 according to the first embodiment suppress the low frequency pulsation (beat) of the motor current though there is a voltage ripple in the DC voltage when a small capacity of the smoothing capacitor 3 is used. This provides a high drive performance. Further, reduction in the capacitance of the smoothing capacitor 3 allows use of a film capacitor of a small capacitance with a long life in place of an electrolysis capacitor.

Third Embodiment

Figure 10:
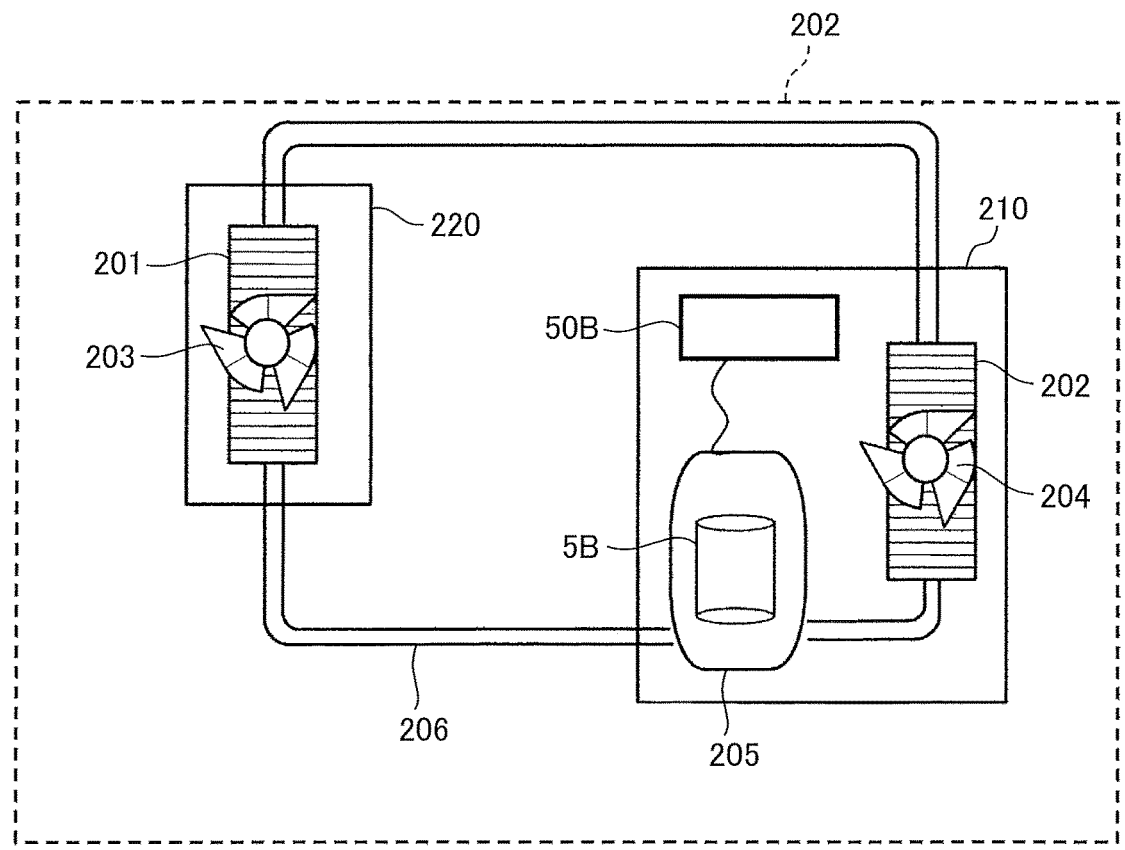
FIG. 10 is a block diagram of a freezing device according to a third embodiment of the present invention.

FIG. 10 is a block diagram of a freezing device 200 such as an air conditioner and a refrigerator, according to a third embodiment. The freezing device 200 is a device conditioning an air temperature including an outdoor unit 210 and an indoor unit 220 connected with a refrigerant piping 206. The outdoor unit 210 includes a outdoor heat exchanger 202 for heat exchanging between the refrigerant and the air and a outdoor fan 204 for blowing air to the outdoor heat exchanger 202. The indoor unit 220 includes a indoor heat exchanger 201 for heat exchanging between a refrigerant and the air and the outdoor fan 204 for blowing the air to the indoor heat exchanger 201.

A compressor 205 includes therein a compressor motor 5B including a permanent magnet synchronous motor. A motor drive device 50B drives the compressor motor 5B, which drives the compressor 205. The motor drive device 50B converts the AC voltage from the AC power source into a DC voltage to supply the DC voltage to the motor drive inverter to drive the compressor motor 5B.

The compressor 205 includes therein a compressing mechanism such as a rotary compressor or a scroll compressor, etc. The compressing mechanism is driven by the compressor motor 5B.

When the compressing mechanism includes the scroll compressor, compressing is made with a fixed scroll and a revolving scroll in which a compressing chamber is formed between the fixed scroll and the revolving scroll through revolving motion.

The motor drive device 50 according to the first embodiment or the motor drive module 51 according to the second embodiment is used as the motor drive device 50B. This suppresses the low frequency pulsation (beat) of the motor current thorough there is a voltage ripple in the DC voltage and provides a high control performance. Further, suppression of the motor current beat provides a stable driving at a higher modulation factor (over modulation), so that a voltage utilization rate of the inverter can be improved. Further, the user of the motor drive device 50 according to the first embodiment, or the motor drive module 51 according to the second embodiment provides reduction of vibration and noise of the product,

DESCRIPTION OF REFERENCE SYMBOLS

1 AC power source
2 rectifying circuit
3 smoothing capacitor
4 inverter circuit
5 motor
5B compressor motor
6 controller (control unit)
7 bus bar current detection circuit
8 DC voltage detecting circuit
10 speed controller
11 d-axis current t command generator
12 voltage controller
13 two-axis/three-phase converter
14 command voltage adjuster
15 speed and phase estimator
16 three-phase/two-axis converter
17 current reproducing calculator
18 PWM controller
19 beat suppression controller
20 two-axis/three-phase converter
21 three-phase/two-axis converter
22 PLL processor
23 PI controller
24 two-axis/three-phase converter
25 PI controller
26 integrator
30 U-phase modulation wave waveform
31 carrier wave
32 DC voltage waveform
33 U-phase voltage waveform
34 U-phase current waveform
35 U-phase current waveform
41 U-phase current beat waveform
42 beat rotation axis phase wave
43 qb-axis component quantity waveform
44 U-phase voltage correction waveform
50 motor drive device (electric power converting device)
51 motor drive module
101 controller pc board
102 switching devices (power module)
200 freezing device
201 indoor heat exchanger
202 outdoor heat exchanger
203 room fan
204 outdoor fan
205 compressor
206 refrigerant piping

The invention claimed is:

1. An inverter comprising:
   a rectifying circuit that converts a first AC voltage from an AC power source into a DC voltage;
   a smoothing capacitor that smoothes the DC voltage, which is an output of the rectifying circuit;
   an inverter circuit that converts, into a second AC voltage, the DC voltage which is an output of the smoothing capacitor; and
   a controller that estimates a frequency, a phase, and an amplitude of a current beat component in an output current of the inverter circuit using a PLL (Phase Locked Loop) process and corrects a voltage command to the inverter circuit based on the estimated frequency, the estimated phase, and the estimated amplitude to reduce the current beat component.

2. The inverter as claimed in claim 1, wherein the controller calculates the current beat component on the basis of a difference between the output current of the inverter circuit and a current command value to the inverter circuit.

3. The inverter as claimed in claim 1,
   wherein the controller:

calculates a db-axis current component quantity and a qb-axis current component quantity from the current beat component through a first fixed/rotational-coordinates conversion, estimates a frequency of the current beat component based on the db-axis current component quantity, estimates the phase by an integration operation using the estimated frequency, and estimates the amplitude based on the qb-axis current component quantity upon adjusting the db-axis current component quantity to essentially zero.

4. The inverter as claimed in claim 3, wherein the controller determines an occurrence of a beat phenomenon based on the estimated frequency, the estimated phase, and the estimated amplitude and performs correction of the voltage command when the occurrence of the beat phenomenon is determined.

5. The inverter as claimed in claim 1, wherein the controller calculates a correction quantity to a voltage command of a qb-axis from a difference between a qb-axis current component quantity and a predetermined value using a proportional controller, an integrating controller, or a proportional plus integrator, and calculates three-phase voltage correction quantities on the basis of the correction quantity and the estimated phase using a second fixed/rotational-coordinates conversion.

6. A motor drive device, comprising:
an inverter comprising:
a rectifying circuit that converts a first AC voltage from an AC power source into a DC voltage;
a smoothing capacitor that smoothes the DC voltage, which is an output of the rectifying circuit;
an inverter circuit that converts, into a second AC voltage, the DC voltage which is an output of the smoothing capacitor;
a controller that estimates a frequency, a phase, and an amplitude of a current beat component in an output current of the inverter circuit using a PLL (Phase Locked Loop) process and corrects a voltage command to the inverter circuit based on the estimated frequency, the estimated phase, and the estimated amplitude to reduce the current beat component; and
a motor connected to the inverter circuit that is driven by an output current of the inverter circuit.

7. The motor drive device as claimed in claim 6, wherein the controller estimates a frequency of the AC power source based on a ripple frequency of a DC voltage from a frequency error in the PLL process.

8. A freezing device comprising:
a compressor that compresses a refrigerant;
a heat exchanger that performs heat-exchange between the refrigerant and air;
a blower fan that causes air to flow to the heat exchanger, further comprising;
a compressor motor provided to the compressor; and
a motor drive device, comprising:
an inverter comprising:
a rectifying circuit that converts a first AC voltage from an AC power source into a DC voltage;
a smoothing capacitor that smoothes the DC voltage, which is an output of the rectifying circuit;
an inverter circuit that converts, into a second AC voltage, the DC voltage which is an output of the smoothing capacitor;
a controller that estimates a frequency, a phase, and an amplitude of a current beat component in an output current of the inverter circuit using a PLL (Phase Locked Loop) process and corrects a voltage command to the inverter circuit based on the estimated frequency, the estimated phase, and the estimated amplitude to reduce the current beat component; and
a motor connected to the inverter circuit that is driven by an output current of the inverter circuit,
wherein the motor drive device drives the compressor motor.

* * * * *